Nov. 11, 1952

E. E. SHARPE 2,617,198

PULL-OUT MEASURING TAPE DISPENSER

Filed June 13, 1945

INVENTOR
EVERETT E. SHARPE
BY
Moses, Nolte, Crews & Berry
ATTORNEYS

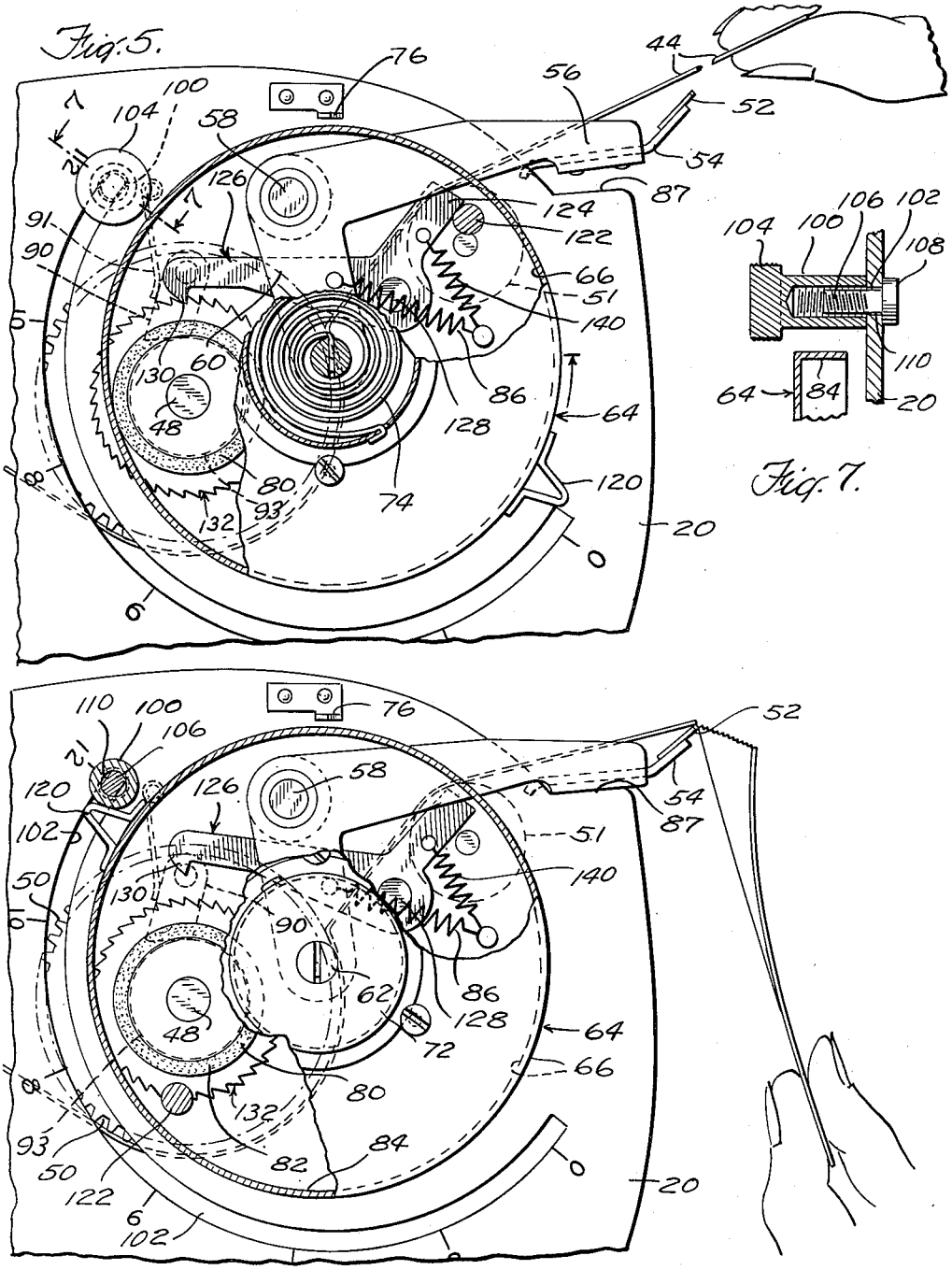

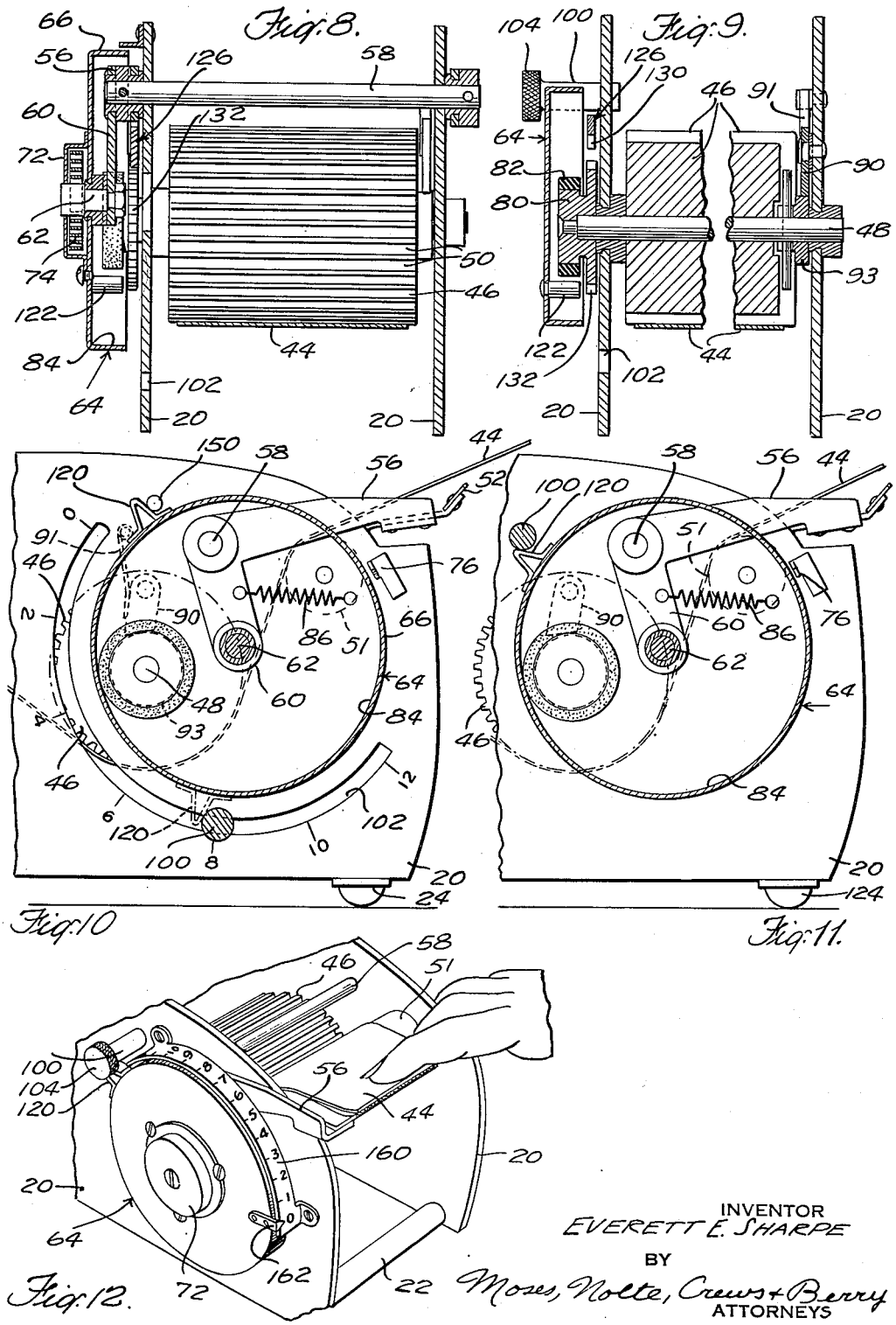

Patented Nov. 11, 1952

2,617,198

UNITED STATES PATENT OFFICE 2,617,198

PULL-OUT MEASURING TAPE DISPENSER

Everett Emil Sharpe, Shelton, Conn., assignor to Better Packages Incorporated, a corporation of New York Application June 13, 1945, Serial No. 599,267

14 Claims. (Cl. 33—131)

1

This invention relates to tape dispensers for serving tape in measured lengths. It is particularly applicable to the serving and measuring of tacky tape, that is, tape which is in a permanently adhesive or sticky condition and which may be applied to the package or other article to which it is to be attached by pressure without preliminary moistening. In some aspects, however, the invention is applicable to the dispensing of measured lengths of non-tacky or non-adhesive tapes.

The capability of a tape dispenser to measure the tape dispensed is very important. If there is no means by which the tape dispensed can be accurately measured, great waste results, as the operator is sure to make mistakes in estimating the lengths of tape which he needs. If he dispenses too short a piece, he may have to throw it away, and if he dispenses more than he needs, obviously the excess is wasted. Usually to be on the safe side, he will habitually dispense pieces longer than are actually required, so that there is a constant use of an unnecessary amount of tape. There is also waste of the operator's time, because he is uncertain as to just how much he is getting, and has to move more slowly than if he can see at a glance that he is dispensing the right length. Furthermore, he will sometimes dispense a wrong length and have to throw it away, with resultant waste of time. Wastage of tape is particularly to be guarded against with many of the wide and relatively expensive tacky tapes which are now extensively used.

The present invention is as to some of its features an improvement upon the dispenser of U. S. Patent No. 2,366,971 to Theodore H. Krueger, dated January 9, 1945. An important feature of improvement over said patent is that in the present dispenser means are provided for visually indicating to the operator the length of tape which he is dispensing, thereby enabling him to withdraw at each operation such length of tape as he may select. The dispenser may also, if desired, be provided with means by which it may be set to dispense any predetermined length of tape within the capacity of the machine. The use of such means enables the operator to dispense repeatedly a given length of tape, and he may also, by the use of visual measuring means, select any length shorter than that for which the machine is set, and which he may dispense at his option. The machine may also be readily manipulated in such a way as to permit long lengths of tape to be dispensed.

In the accompanying drawings in which are illustrated certain preferred embodiments of the invention,

2

Figure 5 is a side elevation of a part of the machine shown in Fig. 2, parts being broken away, and showing the stop pawl in position to stop the feed of tape at the predetermined length for which the machine is at the time set.

Figure 6 is a view similar to Fig. 5 showing the dispensed piece of tape being severed and the pawl released, and the measuring drum returned to its initial position so as to permit the next length of tape to be dispensed.

Figure 7 is a detailed transverse section on line 7—7 of Fig. 5 showing the adjustable stop.

Figure 8 is a vertical transverse section on line 8—8 of Fig. 2.

Figure 9 is a similar section on line 9—9 of Fig. 2.

Figure 10 is a side elevation, parts being broken away, showing a modified form of the machine.

Figure 11 is a side elevation, parts being broken away, showing another modified form of the machine; and Figure 12 is a partial perspective view of a machine showing a modified form of the visual indicating means.

Figures 3, 4:
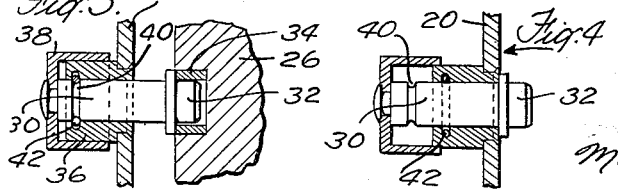
Figure 3 is a detailed vertical section on line 3—3 of Fig. 2, showing a pivot support for the tape spool holding the supply of tape.
Figure 4 is a similar view showing the pivot support retracted to permit changing of the spool.

Referring to the drawings in detail, particularly to the form of the invention shown in Figs. 1 to 9, inclusive, the machine comprises a frame shown as having side plates 20 connected by cross members 22 and supported upon feet 24. Mounted between the side plates is a spool 26 carrying a roll of tape 28. The supply of tape may be carried in any suitable manner in the machine. In the construction shown, spool 26 is mounted on a pair of retractable pivots 30 (Figs. 3 and 4) having heads 32 adapted to be received in sockets 34 in the ends of the spool. The pivots 30 slide in bushings 36 fixed to the side walls of the machine. The pivots have cap shaped heads 38 at their outer ends by which they may be pushed in to hold the spool, as shown in Fig. 3, or pulled out so as to permit the spool to be changed. These heads telescope over the bushings when pushed in. The pivots are preferably provided with grooves 40 into which snap spring rings 42 hold the pivots in position when they are pushed into engagement with the spool.

The tape web 44 passes from the roll 28 into engagement with an adhesion member having an adhesion surface travelling in an orbital path (for example a roller or an endless belt). In the construction illustrated the adhesion member is a roller 46 which is mounted for rotation on a shaft 48. The adhesion member is formed out of suitable material for engagement with the surface of the tape without slippage between the two, so that the tape and member move together when the tape is advanced. For use with tacky tape, the tacky side of the tape contacts the member or roller which may conveniently be made of wood, and may be provided with grooves 50 in its surface. This provides for good adhesion but still permits the tape to be stripped from the surface of the adhesion member without undue effort. In the case of dispensing non-adhesive tape, the roller might be formed with some other kind of a surface, such for instance as rubber.

Figure 1:
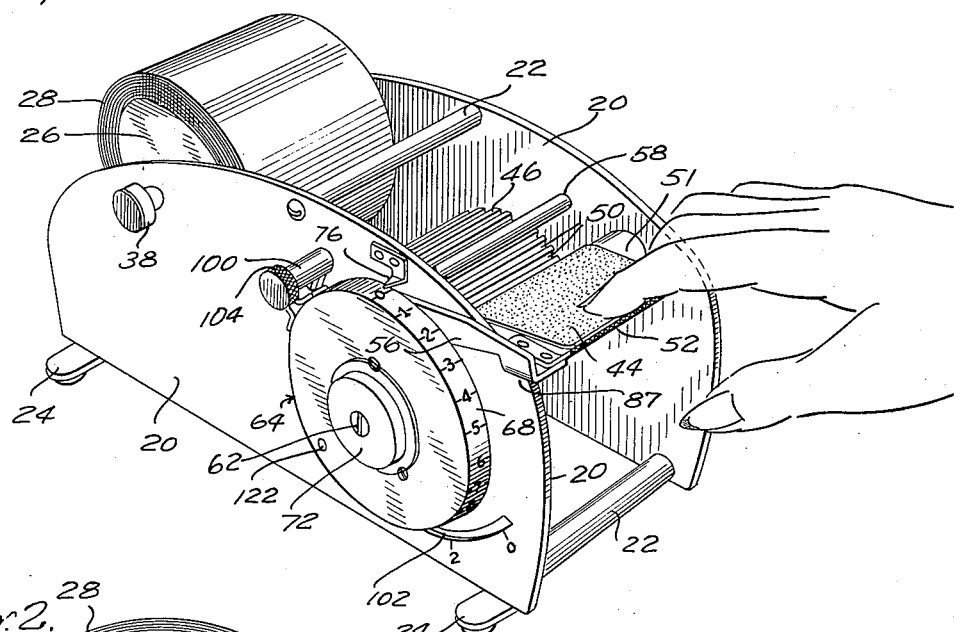
Figure 1 is a perspective view of one form of dispenser embodying the invention and showing both visual or selective measuring means, and settable means by which the dispenser may be adjusted to repeatedly dispense a given length of tape.
Figure 2:
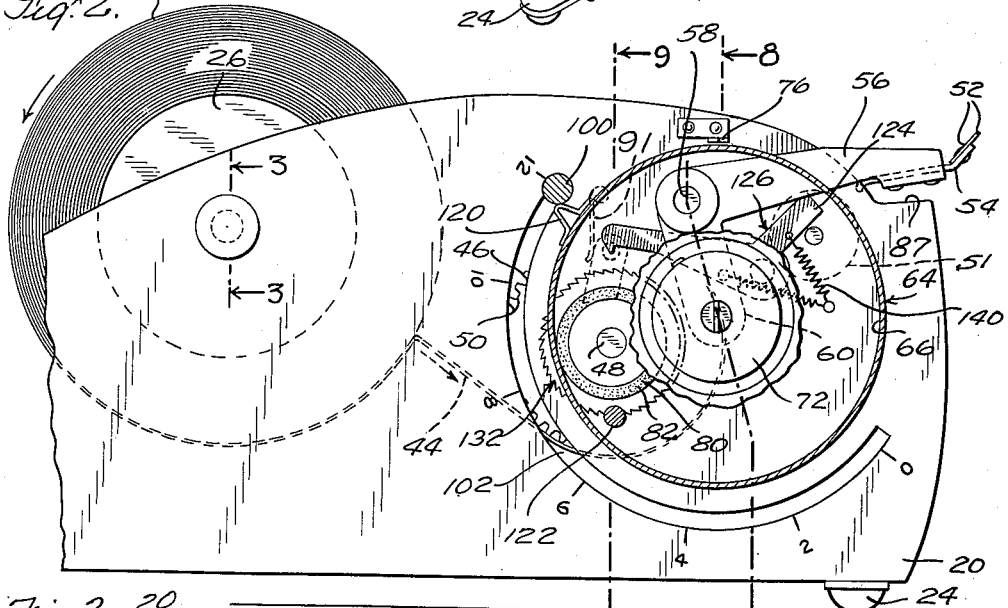
Figure 2 is a side elevation of the dispenser shown in Fig. 1, the measuring drum being shown in vertical section, and parts of the side wall of the machine being broken away to show the internal mechanism of the machine.

In the construction shown, the adhesive side of the tape passes in contact with the roller 46 through part of its circumference, then passes over an idler roller 51 and its end is then brought to a position where its tacky surface is exposed, as shown in Fig. 1, so that it may be readily lifted by bringing the fingers into contact with the tacky surface and grasped between the fingers and thumb. In the machine shown the tape passes under the adhesion roller with its adhesive side up. It is obvious that this arrangement can be varied depending upon the relative location of the parts of the machine and in what position it is desired to have the tape leave the machine, whether horizontally, vertically, or otherwise.

In the machine shown the tape is dispensed by merely being grasped and pulled away from the machine until the desired length has been drawn out. It is then cut off by suitable means and applied to the package or other article upon which the tape is to be used. In the construction shown a serrated cutter 52 is provided against which the tape may be drawn and cut off, as shown in Fig. 6. The cutter 52 is shown as mounted in an upwardly and outwardly inclined position on the edge of a grasping table 54 upon which the end of the tape will rest until the operator is ready to grasp the same and draw it out. The table 54 is mounted between two arms 56 forming with them a yoke exposed at the front of the machine. The arms 56 are pivoted on a shaft 58 carried by the side walls of the machine. One of the arms 56 is of bell-crank shape, and is provided with an angularly disposed arm 60 which carries at its lower end a stud 62 upon which is rotatably mounted a measuring drum 64. This drum is shown as of cup shape having a peripheral flange 66 which in the form of the invention now being described carries a scale 68 bearing suitable indicia for indicating tape lengths. In the example shown the scale is divided in inches from 0 to 12. Secured to the side of the measuring drum is a cup 72 within which is mounted a spiral spring 74, the inner end of which is anchored to the end of the stud 62. The spring 74 tends to return the drum 64 to zero position whenever it is moved away from such position and then released. A suitable pointer 76 is mounted on the side frame of the machine and serves to indicate the readings of the scale 68.

Means are provided for rotating the drum 64 whenever the adhesion roller 46 is turned by withdrawal of tape from the machine. For this purpose there is mounted on the end of the adhesion roller shaft 48 a friction wheel 80 which may be provided with any suitable friction surface such as a rubber tread 82. The surface of the latter bears against the inner surface 84 of the flange 66 of the drum 64. If desired the inner surface 84 may be knurled or otherwise roughened in order to secure a better frictional engagement with the surface of the friction wheel. The drum 64 being pivoted on the end of the bell-crank arm 60 is movable when the bell-crank is turned about its pivot 58. Normally the bell-crank is biased in an anticlockwise direction (Figs. 1, 5 and 6) by tension spring 86, and the inner surface of the drum 64 is thus normally held in frictional engagement with the friction wheel. Accordingly when a piece of tape is drawn out and the adhesion roller rotated by contact with the tape, the drum 64 will also be rotated and the numerals of the scale 68 will indicate the length of tape withdrawn at any instant. The operator can therefore draw out a measured piece of tape of the length which he desires. When he has pulled out a piece of tape as long as he wants he draws it down across the cutter, as shown in Fig. 6. The pulling of the tape down across the cutter, however, also pulls down the cutter, and thus rotates the bell-crank lever against the tension of the spring 86. This results in the movement of the inner surface of the flange of the drum 64 out of engagement with the friction wheel to the position shown in Fig. 6, whereupon the drum 64 is freed from its driving engagement, and is therefore immediately returned to its zero position by the spring 74. The end of the tape from which the piece dispensed has been severed now rests upon the table 54, as shown in Fig. 1, and the apparatus is ready for another dispensing operation. The downward movement of the yoke and table is limited by engagement of the arms 56 with ledges 87 on the side members 20. Ordinarily the tearing off of the tape against the cutter will hold the yoke depressed long enough to permit return of the measuring drum to zero position. However if in any instance this period should not be sufficient for complete return of the drum, a further release of the drum from engagement with the friction wheel will take place when the operator places his fingers on the tape lying on the grasping table, when he is taking hold of the tape to pull out the next piece. This will again depress the table and yoke and move the drum out of contact with the friction wheel.

In order to prevent possible backward rotation of the adhesion roller which would interfere with the accuracy of measurement, a pawl 90 is preferably provided which is pressed by a spring 91 into engagement with the knurled wheel 93 fixed to the roller shaft 48.

Presettable measuring means

While the dispenser of the present invention may be used with reliance placed on visual measuring only, in the preferred embodiment illustrated in Figs. 1 to 9, inclusive, means are provided which may be set so as to limit the maximum length of tape which may be dispensed for any particular setting. Thus the operator may simply draw out the length of tape for which the machine is set, and get such length repeatedly as often as required. The mechanism shown for this purpose comprises a stop pin 100 mounted in the curved slot 102 in one of the walls of the frame, and adapted to be clamped in such slot in any desired position. The slot 102 is preferably curved on the arc of a circle concentric with the axis of the measuring drum when the latter occupies the position in which it is in driving engagement with the friction wheel 80. A preferred construction of stop pin is shown in Fig. 7. As here illustrated, the pin 100 is provided with a knurled head 104 by which it may be turned upon a screw 106. The latter has a head 108 fitting against the inside of the wall 20 and with a flattened or squared shank 110 which is adapted to slide between the walls of the slot 102 without turning in the slot. With this construction the operator can set the pin 100 at any position by simply giving the head 104 a slight turn so as to loosen the pin upon the screw, and then move the pin to proper position in the slot. The pin can then be locked in such position by turning the head 104 so as to cause the end of the pin and the head 108 of the screw to clamp the frame member 20. The measuring drum 64 has a stop bracket 120 mounted thereon which is adapted to engage the pin 100 which thus limits the movement of the drum 64 in a clockwise direction. When the pin 100 is set at the upper end of the slot 102, as shown in Figs. 1, 5 and 6, then the drum 64, when released, will move as far as it can in a clockwise direction. When the stop 100 is set further along in the slot as at one of the positions marked 10, 8, 6, 4 and 2, in Fig. 2 (or some intermediate position), then the drum 64 will be prevented from returning all the way to its zero position, as shown in Fig. 1.

The drum 64 carries on its inside a trip pin 122 which, when the drum rotates in a counterclockwise direction, engages a heel 124 on a stop pawl 126 which is pivoted to the side frame at 128. The stop pawl has a tooth 130 adapted to engage with the teeth of a ratchet wheel 132 which is mounted on the shaft 48 of the adhesion roller 46, and may conveniently be formed as a part of the friction wheel 80. The pawl 126 is normally held in the retracted position shown in Figs. 2 and 6 by tension spring 140. When in this position the ratchet wheel 132 is of course out of engagement with the pawl and the adhesion roller is free to turn as the tape is drawn out. The drawing out of the tape, however, with rotation of the adhesion roller also causes the drum 64 to be rotated, as already described, so that eventually the pin 122 will reach the position shown in Fig. 5 where it will engage the heel 124 and thereby force the pawl down into engagement with the ratchet wheel. This is the position shown in Fig. 5 in which it will be seen that the pawl engaging the ratchet wheel positively prevents further rotation thereof, and thus stops the feed of the tape. When the stop pin 100 is set to the limit of its movement in clockwise direction, then the maximum length of tape may be fed. However, moving the stop pin around in a counterclockwise direction moves the drum 64 around, and accordingly advances the starting position of the pin 122. This shortens the travel of the pin, drum and adhesion roller before tripping of the pawl takes place and thus shortens the length of tape which can be fed.

The numerals 2, 4, 6, 8, etc. placed adjacent to the slot 102 facilitate the ready setting of the pin 100 so as to give a predetermined and measured length of tape.

The construction of the dispenser described makes it possible for the operator to dispense a piece of tape of any desired long length when such long strip of tape is required. He accomplishes this by simply depressing the table and yoke with his finger which will prevent the stoppage of the rotation of the adhesion roller so that he can pull out as long a piece as desired. He can either depress the yoke and hold it depressed while pulling out the tape or he can pull out the maximum length for which the machine is set then depress the yoke momentarily without cutting off the strip of tape and pull out another length and so on until the desired length has been dispensed.

Fig. 10 shows a modified form of the dispenser in which the stop pawl and the ratchet wheel on the adhesion roller shaft are omitted. In this construction the stop bracket 120 on the drum 64 is normally located on a part of the drum between the stop pin 100 and the pin 150. Prior to pulling out the tape the bracket will rest against the pin 150, as shown in the full line position in Fig. 10. Upon drawing out the tape the bracket will move down to the dotted line position shown in Fig. 10. Thus the stop pin will limit the movement of the drum in a counterclockwise direction caused by the drawing out of the tape. As soon as enough tape has been drawn out to rotate the drum 64 so as to bring the stop bracket 120 against the pin 100 further feed of tape is prevented by the frictional engagement between the friction wheel 80 and the inner surface 84 of the drum flange 66. The friction is sufficient, particularly if this surface 84 is knurled or otherwise roughened, to effectively hold the friction wheel 80 and adhesion roller 46 against further rotation when movement of the drum is stopped by engagement of the stop bracket 120 with the pin 100. By setting the pin 100 at the proper position in the slot 102, it will be seen that the feed of tape can be stopped when any desired length has been pulled out. As soon as the lever 56 has been depressed the drum is moved out of engagement with the friction wheel, and returns to its initial position which is determined by engagement between the stop bracket 120 and a fixed pin 150.

Figure 11 shows a simplified form of the machine in which adjustable means for presetting the length of tape to be fed is omitted. In this construction any length of tape may be fed up to one rotation of the measuring drum the operator reading the length on the visual scale in a manner already described.

Figure 12 shows a modified arrangement of the visual scale. In this construction the scale 160 instead of being mounted on the rotatable drum is attached to the side frame of the machine and the rotatable drum is provided with a pointer 162 which moves over the scale as the drum is rotated enabling the length of tape drawn out to be accurately determined.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be embodied.

What is claimed is:

1. In a tape dispenser, a support for a roll of pressure sensitive tape, a cutter, a tape table mounted for yielding movement adjacent to said cutter for supporting the uncut end of the tape with its tacky side exposed to manual touch, means for biasing said tape table in one direction, an adhesion roller in adhesive contact with the tacky side of the tape and journaled between the tape support and the feed table, a reciprocating measuring member for measuring the length of tape dispensed, an engageable and disengageable driving connection between said adhesion roller and said reciprocating measuring member, said driving connection being normally held by said biasing means in engagement so as to cause the adhesion roller to move the measuring member in definite ratio with said roller and the tape, but being disengageable by displacement of said yieldable tape table, and a calibrated scale and indicator, one mounted on the reciprocating measuring member, the other in a fixed position, so that the length of tape withdrawn at every moment during the tape withdrawal is shown by the scale and indicator.

2. In a tape dispenser, a support for a roll of pressure sensitive tape, a cutter to sever the tape, a movable support for said cutter, a tape grasping table carried by the cutter support adjacent to the cutter, an adhesion roller in peripheral contact with the adhesive surface of the tape and rotatably mounted between the tape supply and the tape cutter, a measuring drum rotatably mounted on said movable cutter support, a friction roller connected to rotate with said adhesion roller and arranged to frictionally engage said measuring drum when said drum is moved to one position by said movable cutter support, and to be disengaged by said drum when said cutter support and drum are moved to another position, and means to return the measuring drum to zero position upon disengagement of its driving connection with said friction wheel.

3. A device as claimed in claim 2 in which the movable cutter support is in the form of pivoted lever means carrying the tape grasping table, and the cutter is in the form of a blade extending transversely along the edge of the tape grasping table but at an obtuse upwardly directed angle to the plane thereof.

4. In a tape dispenser, a support for a roll of pressure sensitive tape, a cutter to sever the tape, means for supporting the cutter including a pivoted bell crank lever having the cutter mounted on one arm thereof, an adhesion roller in peripheral contact with the adhesive surface of the tape and rotatably mounted between the tape supply and the tape cutter, a shaft journaled in fixed bearings on which said adhesion roller is fixed, a friction wheel fixed to a projecting end of said shaft and movable with said adhesion roller, a measuring drum pivoted on the second arm of said bell crank lever and having a friction surface movable into and out of engagement with said friction wheel in accordance with the movements of said bell crank lever, spring means for biasing said bell crank lever in a direction to hold the measuring drum in frictional contact with said friction wheel, and means for returning the measuring drum to its original position on movement of said bell crank lever to move said measuring drum out of engagement with said friction wheel.

5. A device as claimed in claim 4 in which the measuring drum has a flange, the internal surface of which engages the external surface of the friction wheel so that said drum is rotated in the same direction as the direction of rotation of said friction wheel.

6. In a tape dispenser, a support for a roll of pressure sensitive tape, a displaceable cutter to sever the tape, means to return said cutter to original position after displacement upon severance of the tape, an adhesion member movable in an orbital path by its adhesion to the moving tape as the tape is dispensed, movable stop means for stopping further orbital motion of the adhesion member when a predetermined length of tape has been dispensed, means for biasing said stop means to normally inactive position, a reciprocating measuring member, clutch means normally engaging said measuring member in driving engagement with said adhesion member so as to cause said measuring member to be driven in its forward direction in synchrony with the adhesion member, a connection between said displaceable cutter and said clutch means for disengaging said clutch means when said cutter is displaced by severance of the tape, means to return the measuring member to its original position when said clutch means are disengaged, and a trip member carried by the measuring member to move said stop means to active position to stop movement of the adhesion member, said stop means moving to inactive position to unlock the adhesion member when the trip member is withdrawn by return travel of the measuring member.

7. In a tape dispenser, a support for a roll of pressure sensitive tape, a displaceable grasping table to support the end of the tape to be dispensed from the roll, means to return said displaceable grasping table to its original position after each dispensing operation, an adhesion member movable in an orbital path by its adhesion to the moving tape as the tape is dispensed, stop means for stopping further orbital motion of the adhesion member when a predetermined length of tape has been dispensed, a reciprocating measuring member, clutch means normally engaging said measuring member in driving engagement with said adhesion member so as to cause said measuring member to be driven in its forward direction in synchrony with the adhesion member, a connection between said displaceable grasping table and said clutch means for disengaging said clutch means when said grasping table is displaced, means to return the measuring member to its original position when said clutch means are disengaged, a trip member carried by the measuring member to trip said stop means to cause it to stop movement of the adhesion member, and means to unlock the adhesion member when the trip member is withdrawn by return travel of the measuring member.

8. A tape dispenser as claimed in claim 7 in which the grasping table carries a cutter blade extending transversely across the path of tape for severing the tape.

9. In a pull-out dispenser for pressure sensitive tape, a support for a roll of tape, an adhesion member movable in an orbital path by adhesion to the moving tape as the latter is pulled out of the dispenser, a reciprocable measuring member, a settable stop for limiting the return travel of said measuring member, clutch means for connecting said measuring member in driving engagement with said adhesion member and disengaging it therefrom, movable, normally inactive stop means actuated by forward movement of said reciprocating measuring member for stopping orbital travel of the adhesion member when the measuring member has reached the limit of movement as determined by said stop means, and means to move said measuring member back to its original position as determined by the position of said settable stop when said clutch means disengage the same from driving engagement with said adhesion member, the return of said measuring member releasing the stop means and permitting it to return to its normally inactive position.

10. A device as claimed in claim 9 in which a scale is provided for indicating movement of said reciprocating measuring member in units of length of tape dispensed.

11. In a pull-out tape dispenser, a support for a roll of pressure sensitive adhesive tape, an adhesion member movable in an orbital path by adhesion to the moving tape as the latter is pulled out of the dispenser, a friction wheel rotated by movement of the adhesion member, a toothed wheel connected to rotate with said friction wheel, a measuring drum, a movable support upon which said measuring drum is rotatably mounted, said support being movable to bring said drum into frictional driving engagement with said friction wheel and to move it out of such engagement, a trip member carried by the measuring drum, a pawl having a tooth normally held out of engagement with said toothed wheel, said pawl adapted to be engaged by said trip member so as to move said tooth into temporary locking engagement with said toothed wheel, and means for returning the measuring drum to its original position when disengaged from its driving connection with said friction wheel, the return movement of said drum releasing the engagement of said trip member with said pawl so as to permit the removal of the tooth of said pawl from engagement with said toothed wheel.

12. In a pull-out tape dispenser, a frame including a side plate, a support for a roll of pressure sensitive tape, an adhesion member movable in an orbital path by adhesion to the moving tape as the latter is pulled out of the dispenser, a friction wheel rotated by movement of the adhesion member, a measuring drum, a movable support upon which said measuring drum is rotatably mounted, said support being movable to bring said drum into frictional driving engagement with said friction wheel and to move it out of such engagement, a tearoff cutter mounted on said movable support, said measuring drum being mounted adjacent to said side plate of the frame and being rotatable in a plane substantially parallel with said side plate, said side plate having an arcuate slot therein concentric with the center of rotation of said measuring drum when said drum is moved into a position in which it is in frictional driving engagement with said friction wheel, a stop pin adjustably mounted in said arcuate slot, a stop on said measuring drum adapted to engage said adjustable stop pin, and means for returning said measuring drum to a position in which said stop engages said stop pin upon movement of said movable support and tearoff cutter to disengage its driving connection with said friction wheel.

13. In a tape dispenser, a frame including a side wall, a support for a roll of pressure sensitive adhesive tape, an adhesion roller mounted on an axle journalled transversely of said wall and projecting through the same, a friction wheel mounted on said axle outside of said side wall, a lever pivoted adjacent to said side wall to move in a plane substantially parallel thereto, a measuring drum rotatably mounted on said lever outside of said side wall, said drum having a friction surface adapted to engage said friction wheel, said lever being movable to shift said measuring drum in a plane substantially parallel to the plane of the side wall so as to bring said friction surface on the measuring drum into and out of frictional engagement with said friction wheel, a spring engaged with said measuring drum for turning said drum to its initial position upon movement of the drum out of engagement with said friction wheel, and means for biasing said lever so as to normally move the same to a position in which said measuring drum is in engagement with said friction wheel.

14. In a tape dispenser, a frame including a side wall, a support for a roll of pressure sensitive adhesive tape, an adhesion roller mounted on an axle journalled transversely to said side wall and projecting through the same, a friction wheel mounted on said axle outside of said side wall, a lever pivoted adjacent to said side wall to move in a plane substantially parallel thereto, a measuring drum rotatably mounted on said lever outside of said side wall and having a flange turned towards said side wall, said flange having a friction surface adapted to engage said friction wheel, said lever being movable to shift said measuring drum in a plane substantially parallel to the plane of the side wall so as to bring said flange on the measuring drum into and out of frictional engagement with said friction wheel, a spring engaged with said measuring drum for turning said drum to its initial position upon movement of the drum out of engagement with said friction wheel, a spring for biasing said lever so as to normally move the same to a position in which said measuring drum is in engagement with said friction wheel, and a cutter blade carried by said lever and extending transversely across the path of the tape adjacent to the front end of the machine.

EVERETT EMIL SHARPE.

REFERENCES CITED

The following references are of record in the file of this patent:

UNITED STATES PATENTS

| Number | Name | Date |
|---|---|---|
| 854,762 | Schaeffer | May 28, 1907 |
| 1,092,802 | Schwartz | Apr. 7, 1914 |
| 2,221,213 | Borden | Nov. 12, 1940 |
| 2,233,361 | Anderson et al. | Feb. 25, 1941 |
| 2,251,942 | Kimball | Aug. 12, 1941 |
| 2,291,668 | Weigolt | Aug. 4, 1942 |
| 2,366,971 | Krueger | Jan. 9, 1945 |
| 2,424,488 | Morin | July 22, 1947 |
| 2,447,145 | Van Cleef et al. | Aug. 17, 1948 |